US012744176B2

(12) United States Patent
Talebinezhad et al.

(10) Patent No.: US 12,744,176 B2
(45) Date of Patent: Sep. 22, 2026

(54) HYBRID CONDUCTIVE PASTE FOR FAST-OPENING, LOW-RATING FUSES

(71) Applicant: Littelfuse, Inc., Chicago, IL (US)

(72) Inventors: Hossein Talebinezhad, Fremont, CA (US); Jianhua J. Chen, Sunnyvale, CA (US); Victor Oliver Tabell, Lipa City (PH)

(73) Assignee: Littelfuse, Inc., Rosemont, IL (US)

( * ) Notice: Subject to any disclaimer, the term of this patent is extended or adjusted under 35 U.S.C. 154(b) by 147 days.

(21) Appl. No.: 18/433,822

(22) Filed: Feb. 6, 2024

(65) Prior Publication Data

US 2024/0274390 A1 Aug. 15, 2024

Related U.S. Application Data

(60) Provisional application No. 63/444,431, filed on Feb. 9, 2023.

(51) Int. Cl.
*H01H 85/06* (2006.01)

(52) U.S. Cl.
CPC .................................... *H01H 85/06* (2013.01)

(58) Field of Classification Search
CPC .......... H01H 2085/0412–0414; H01H 85/046; H01H 85/06
See application file for complete search history.

(56) References Cited

U.S. PATENT DOCUMENTS

| | | | | |
|---|---|---|---|---|
| 3,872,360 A | 3/1975 | Sheard | | |
| 4,496,475 A * | 1/1985 | Abrams | H01G 4/0085 | 428/404 |
| 4,711,814 A | 12/1987 | Teichmann | | |
| 6,034,589 A * | 3/2000 | Montgomery | H01H 85/0411 | 337/296 |
| 6,384,708 B1 * | 5/2002 | Jollenbeck | H01H 85/0411 | 439/890 |
| 9,368,308 B2 | 6/2016 | Blum | | |
| 2005/0141164 A1 * | 6/2005 | Bender | H01H 85/046 | 361/104 |
| 2006/0066435 A1 * | 3/2006 | Li | H01H 85/06 | 337/186 |
| 2009/0167480 A1 * | 7/2009 | Wiryana | H01H 69/022 | 29/623 |
| 2019/0174634 A1 * | 6/2019 | Landa | H10F 77/1698 | |
| 2020/0352026 A1 * | 11/2020 | Rozbroj | H01H 69/022 | |

FOREIGN PATENT DOCUMENTS

| | | |
|---|---|---|
| EP | 0045482 A1 | 2/1982 |
| EP | 0581428 A1 | 2/1994 |
| WO | 2009086496 A2 | 7/2009 |

OTHER PUBLICATIONS

NN75012281. "Top Surface Metallurgy Of Multilayered Ceramic Modules". IBM_TDB. (Year: 1975).*
Extended European Search Report for EP Application No. 24155149.8, dated Jun. 18, 2024, 7 pages.

* cited by examiner

*Primary Examiner* — Jacob R Crum
(74) *Attorney, Agent, or Firm* — KDW Firm, PLLC

(57) ABSTRACT

Provided herein a circuit protection devices including a fusible element attached to a ceramic substrate, the fusible element comprising a paste including a plurality of nickel particles.

13 Claims, 5 Drawing Sheets

130

| | % Au | % Ni | % Ag | % GF | Resistance (Ω) |
|---|---|---|---|---|---|
| Au-Ni Mixture | 94.5 | 5.5 | 0 | 0 | 60 |
| Au-Ni-Ag Mixture | 68.5 | 4.5 | 27 | 0 | 50 |
| Au-Ni-Ag-GF Mixture 1 | 65.5 | 4.4 | 25.8 | 4.3 | 70 |
| Au-Ni-Ag-GF Mixture 2 | 60.6 | 4 | 23.9 | 11.5 | 115 |
| Au-Ni-Ag-GF Mixture 3 | 54 | 3.5 | 21.3 | 21.2 | 160 |

*FIG. 3*

140

| Line Width | Resistance of Au-Ni Mix | Equivalent rating 250% | 1 msec i2t |
|---|---|---|---|
| 150um | 3.41 Ω | 250 mA (Fast Open) | 0.0034 |
| 500um | 1.48 Ω | 375 mA (Fast Open) | 0.038 |
| 700um | 0.74 Ω | 750 mA (Fast Open) | 0.061 |

FIG. 4

HYBRID CONDUCTIVE PASTE FOR FAST-OPENING, LOW-RATING FUSES

CROSS-REFERENCE TO CORRESPONDING APPLICATIONS

The present application claims the benefit of priority under 35 U.S.C. § 119 to U.S. Provisional Application Ser. No. 63/444,431, titled "HYBRID CONDUCTIVE PASTE FOR FAST-OPENING, LOW-RATING FUSES" and filed Feb. 9, 2023, the disclosure of which is incorporated herein by reference in its entirety.

FIELD OF THE DISCLOSURE

The disclosure relates generally to the field of circuit protection devices and, more particularly, a fusible element formed using a hybrid conductive paste.

BACKGROUND OF THE DISCLOSURE

Fuses, which are commonly used as circuit protection devices, provide electrical connections between sources of electrical power and circuit components that are to be protected. Chip fuses, also known as thin-film fuses, surface-mount fuses, or SMD fuses, are one type of fuse that includes a fusible element disposed between nonconductive layers of material. Conductive vias are connected to each end of the fusible element to provide a means of connecting the fuse within a circuit. Upon the occurrence of a specified fault condition in a circuit, such as an overcurrent condition, the fusible element can melt, or otherwise separate, to interrupt current flow in the circuit path. Protected portions of the circuit are thereby electrically isolated and damage to such portions may be prevented or at least mitigated.

With increasing fabrication on electronic devices and automobiles, the demand for low-rating fuses has been growing significantly. Silver paste is one commonly used conductive paste in the electronic industry. There are many attempts to improve the resistivity of silver (Ag) paste by ceramic additive (GF), but this causes limitations on opening time. Both solid substrate or Green-tape (not fired) substrates can be used for fabricating fuses. Gold paste can be deposited or screen printed on the substrate, although screen printing of the gold paste may result in discontinued lines after firing. The reason behind it is due to shrinkage mismatch between substrate and paste which lead to camber force applied during sintering.

Accordingly, an improved conductive paste is needed to address these and other drawbacks of the current art.

SUMMARY OF THE DISCLOSURE

The Summary is provided to introduce a selection of concepts in a simplified form, the concepts further described below in the Detailed Description. The Summary is not intended to identify key features or essential features of the claimed subject matter, nor is the Summary intended as an aid in determining the scope of the claimed subject matter.

In one approach according to the present disclosure, a circuit protection device may include a ceramic substrate (can be solid and/or green-tape), and a fusible element attached to the ceramic substrate, the fusible element comprising a paste including at least one of the following: a plurality of gold-coated nickel particles, gold paste with Ni particles (coated or not coated), wherein the coating shell can be gold, silver, or graphite. In some embodiments, the paste may or may not have glass frit as additive. Other additive that the paste may or may not have is coated or uncoated Ag particles.

In another approach according to the present disclosure, fuse may include a ceramic substrate, and a fusible link attached to a surface of the ceramic, the fusible link comprising a paste including at least one of the following: a plurality of gold-coated nickel particles, gold paste with Ni particles (coated or not coated), wherein the coating shell can be gold, silver, or graphite. In some embodiments, the paste may or may not have glass frit as additive. Other additive that the paste may or may not have is coated or uncoated Ag particles.

In another approach according to the present disclosure, a method of forming a circuit protection device may include forming a paste comprising a plurality of gold-coated nickel particles, and sintering the paste along a surface of a ceramic substrate to form a fusible link, wherein the paste includes at least one of the following: a plurality of gold-coated nickel particles, gold paste with Ni particles (coated or not coated), wherein the coating shell can be gold, silver, or graphite. In some embodiments, the paste may or may not have glass frit as additive. Other additive that the paste may or may not have is coated or uncoated Ag particles.

BRIEF DESCRIPTION OF THE DRAWINGS

The accompanying drawings illustrate exemplary approaches of the disclosed embodiments so far devised for the practical application of the principles thereof, and in which:

FIG. 3 is a chart depicting resistance for various pastes, according to embodiments of the present disclosure;

FIG. 4 is a chart depicting opening times for various fusible link line widths, according to embodiments of the present disclosure.

Figure 1:
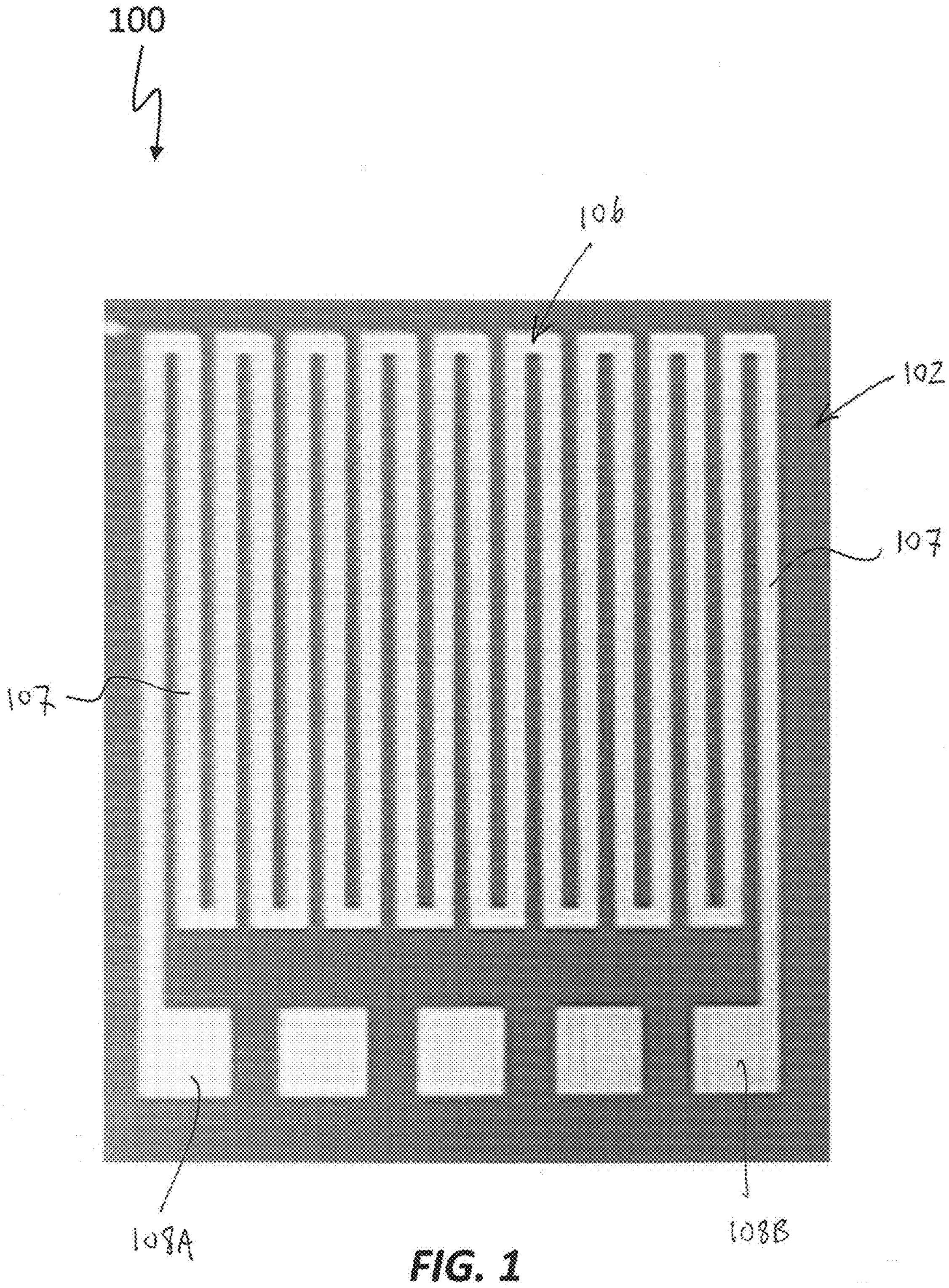
FIG. 1 depicts a top view of a device according to embodiments of the present disclosure.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Furthermore, for clarity, some reference numbers may be omitted in certain drawings.

DETAILED DESCRIPTION

Fuses, devices, and methods in accordance with the present disclosure will now be described more fully hereinafter with reference to the accompanying drawings. The fuses, devices, and methods may be embodied in many different forms and should not be construed as being limited to the embodiments set forth herein. Rather, these embodiments are provided so that this disclosure will be thorough and complete, and will fully convey the scope of the system and method to those skilled in the art.

As will be described herein, embodiments of the present disclosure improve the bonding strength of a gold paste by using gold-plated nickel particles inside the paste. In some non-limiting examples, the nickel particles have an average size of 20 um (and range of approximately 2 to 50 um), with two percent gold as the shell coating, and are particularly useful to modify the gold paste on green-tape substrates (e.g., alumina). These particles will bond the gold areas securely after firing and prevent a discontinuous line. Because bridging between gold particles helps continuity, embodiments herein advantageously enable fabrication of low-rating fuses by low-temperature co-fired ceramic (LTCC) technology, and provide high spend opening overloading properties for the targeted fuses.

FIG. 1 illustrates a top view of a portion of a fuse or circuit protection device (hereinafter "device") 100 according to embodiments of the present disclosure. As shown, the device 100 may include a substrate 102 formed from one or more layers of ceramic material, such as green tape. In other embodiments, the substrate is a rigid or solid ceramic substrate. Along a surface 104 of the device 100 may be a fusible element or fusible link 106. As shown, the fusible link 106 may include one or more line segments 107 extending between vias 108A, 108. The line segments 107 may generally extend parallel to one another. The line segments 107 may have a width between approximately 100 um and 900 um.

Figure 2A:
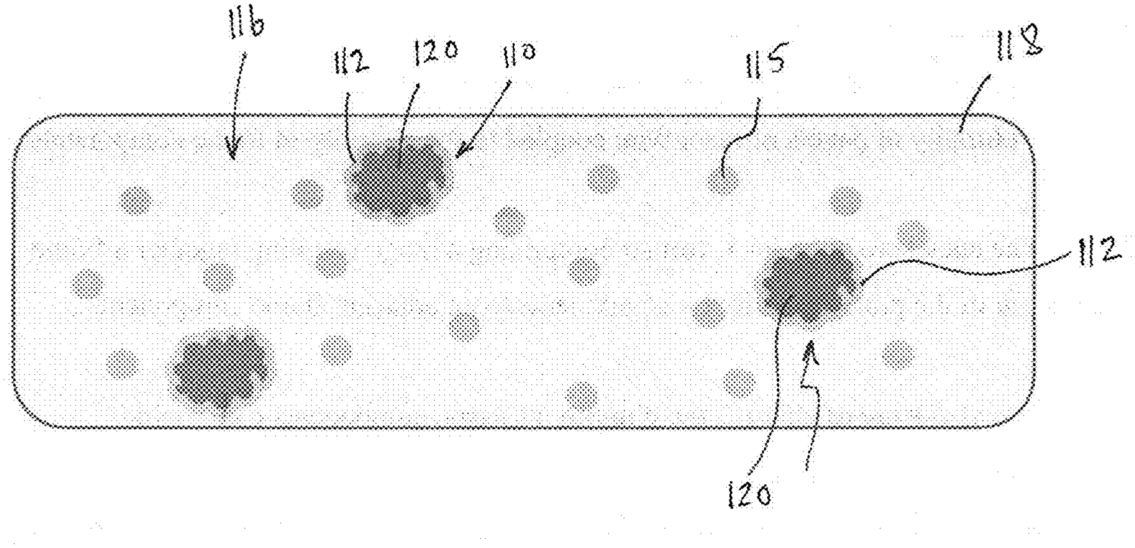
FIG. 2A depicts a side cross-sectional view of a plurality of gold-coated nickel particles, according to embodiments of the present disclosure.

As shown in FIG. 2A, the fusible link 106 may be made from a paste 116 including a plurality of particles 110. In some examples, the paste 116 may be a gold paste include a plurality of gold particles 115 suspended in a material 118, and a plurality of nickel particles 120, which may be covered by a coating 112 to form the particles 110. The coating 112 may be gold, silver, or graphite. In other embodiments, the nickel particles may be uncoated. In yet other embodiments, the paste 116 may have glass frit as an additive and/or Ag particles (coated or not). Although non-limiting, the particles 110 have an average size of 20 um, a size range between 2-50 um, and a particle additive percent between 1-50 percent. Embodiments herein are not limited in this context, however.

Figure 2B:
FIG. 2B depicts a side cross-sectional view of the plurality of gold-coated nickel particles formed into a line, according to embodiments of the present disclosure.

FIG. 2B demonstrates the paste 116 and the particles 110 following formation into a line 122. The line 122 may be formed by depositing and then sintering the paste 116. The particles 110 modify the paste 116 on the substrate 102, and will bond the gold areas intensely after firing to prevent a discontinuous line. In some embodiments, a width of the line is between approximately 100 um and 900 um.

In some embodiments, the substrate 102 may be a monolithic LTCC structure made up of multiple ceramic layers bonded to each other, with conductors located on and within the substrate 102 between adjacent layers. As with known LTCC processes, the substrate 102 may be fabricated using individual green tapes on which the paste 116 is deposited. After stacking and firing at a temperature of, for example up to approximately 900° C., the ceramic layers and the line 122 are formed, respectively. Although not shown, other passive circuit components, such as resistors and capacitors, may also be fabricated within the substrate 102 in this manner.

Also consistent with LTCC substrates, conductors on adjacent layers are electrically interconnected with conductive interconnect vias, such as vias 108A, 108B shown in FIG. 1. Although non-limiting, the vias 108A, 108B are preferably filled through-holes, wherein holes (vias) formed in the green tapes are filled with a suitable conductive material prior to stacking and firing the tapes.

Although non-limiting, each of the ceramic layers of the substrate 102 preferably contains a mixture of electrically-nonconductive materials, typically glass and ceramic particles that, when fired, fuse to form a rigid monolithic structure. An example fired composition for the ceramic layers includes, by weight, about 30% to about 100% of a glass frit material such as $BaO—CaO—SiO_2—Al_2O_3—TiO_2$, with the balance being essentially a ceramic material such as $Al_2O_3$. Suitable thicknesses for the individual ceramic layers are about 50 to about 250 micrometers, and a suitable thickness for the substrate 102 is about 250 to about 1000 micrometers. Embodiments herein are not limited to any particular thickness, however.

FIG. 3 is a chart 130 depicting resistance for various paste compositions, while FIG. 4 is a chart 140 depicting opening times for various fusible link line widths, according to embodiments of the present disclosure.

Figure 5:
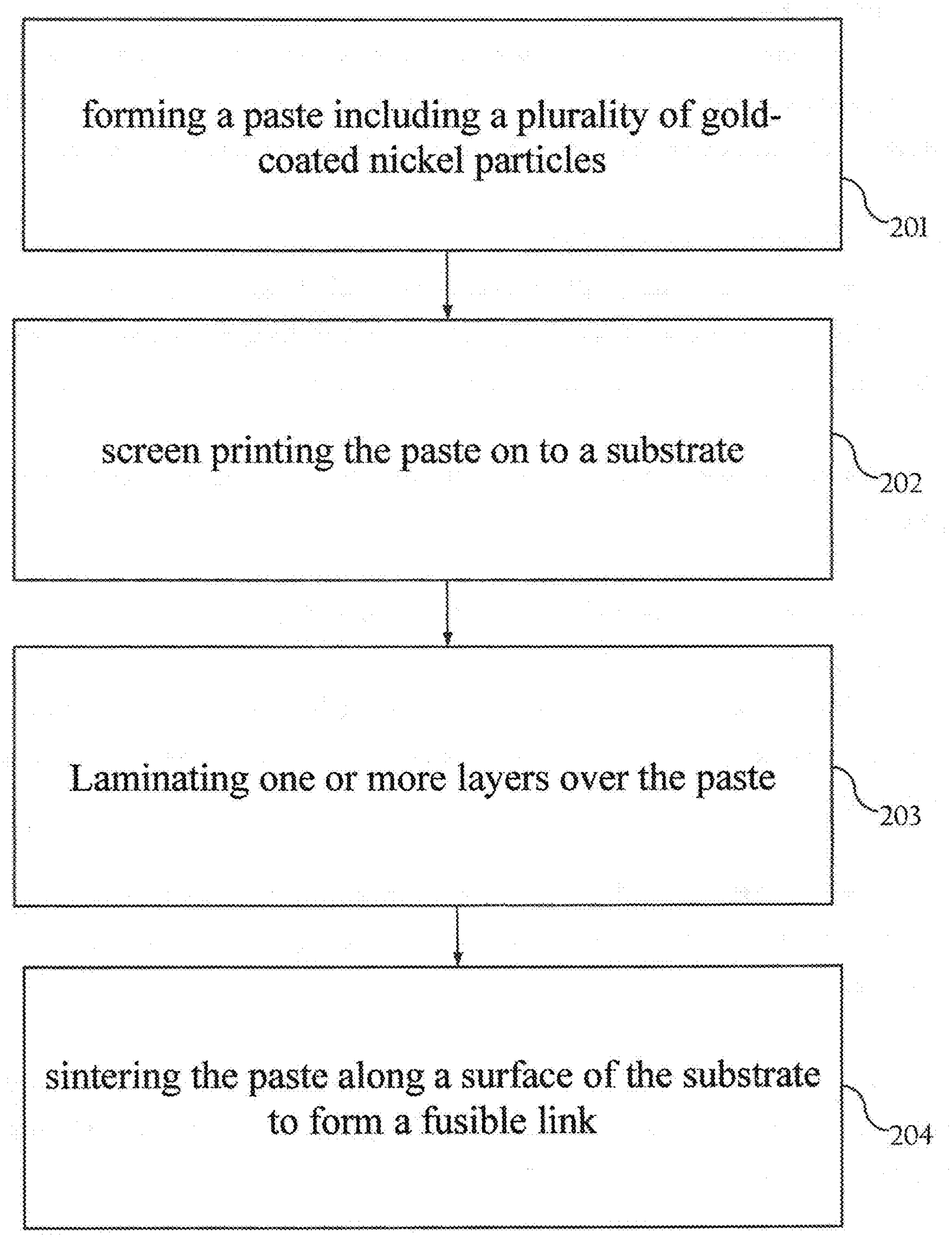
FIG. 5 is a flowchart depicting a method according to embodiments of the present disclosure.

Turning now to FIG. 5, a method 200 according to embodiments of the present disclosure is shown. At block 201, the method 200 may include forming a paste comprising a plurality of gold-coated nickel particles. In some embodiments, the particles have an average size of 20 um, with two percent gold as a shell coating.

At block 202, the method 200 may include screen printing of the gold paste on substrate.

At block 203, the method 200 may include laminating one or more layers on top of the printed gold paste. In some embodiments, the one or more layers are ceramic layers of green tape.

At block 204, the method 200 may include sintering the paste along a surface of the substrate to form a fusible link. In some embodiments, the fusible link is arranged as a series undulating line segments.

For the sake of convenience and clarity, terms such as "top," "bottom," "upper," "lower," "vertical," "horizontal," "lateral," and "longitudinal" will be used herein to describe the relative placement and orientation of components and their constituent parts as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

What is claimed is:

1. A circuit protection device, comprising:

a ceramic substrate; and a fusible element attached to the ceramic substrate, the fusible element comprising a gold paste and a plurality of gold-coated nickel particles inside the gold paste.

2. The circuit protection device of claim 1, wherein the ceramic substrate is a green tape substrate.

3. The circuit protection device of claim 1, wherein the ceramic substrate is a rigid ceramic substrate.

4. The circuit protection device of claim 1, wherein the gold paste further comprises a glass frit as additive.

5. The circuit protection device of claim 1, wherein the gold paste further comprises coated silver particles or uncoated silver particles.

6. The circuit protection device of claim 1, further comprising a set of vias, wherein the fusible element extends between the set of vias.

7. The circuit protection device of claim 1, wherein the fusible element is sintered to a surface of the ceramic.

8. The circuit protection device of claim 1, wherein a particle size of the gold paste is between 2-50 um, and wherein the a particle additive percent is between 1-50 percent.

9. A fuse, comprising:

a ceramic substrate; and a fusible link attached to a surface of the ceramic substrate, the fusible link comprising a gold paste and a plurality of gold-coated nickel particles in the gold paste.

10. The fuse of claim 9, wherein the ceramic substrate is a green tape substrate or a rigid ceramic substrate.

11. The fuse of claim 9, further comprising a set of vias, wherein the fusible link element extends between the set of vias.

12. The fuse of claim 9, wherein the fusible link and the ceramic substrate are sintered.

13. The fuse of claim 9, wherein a particle size of the gold paste is between 2-50 um.

* * * * *